United States Patent [19]
Nalur et al.

[11] Patent Number: 5,876,774
[45] Date of Patent: Mar. 2, 1999

[54] METHOD OF MAKING FAT-BASED CONFECTION

[75] Inventors: Shantha Chandrasekaran Nalur, Dublin; Stephen J. Destephen, Columbus, both of Ohio

[73] Assignee: Nestec S.A., Vevey, Switzerland

[21] Appl. No.: 730,524

[22] Filed: Oct. 11, 1996

[51] Int. Cl.[6] .................................................. A23G 3/00
[52] U.S. Cl. .......................... 426/302; 426/307; 426/306; 426/607; 426/631; 426/660; 426/804
[58] Field of Search ..................... 426/302, 607, 426/610, 631, 660, 804, 306, 309, 307; 554/211

[56] References Cited

U.S. PATENT DOCUMENTS

| | | | |
|---|---|---|---|
| 2,328,791 | 9/1943 | Drury | 426/660 |
| 2,364,592 | 12/1944 | Thomas et al. | 426/660 |
| 2,480,935 | 9/1949 | Kempf et al. | 426/660 |
| 2,760,867 | 8/1956 | Kempf et al. | 426/660 |
| 2,928,747 | 3/1960 | Nowlin | 99/134 |
| 3,098,746 | 7/1963 | Noznick et al. | 426/660 |
| 3,199,984 | 8/1965 | Jensen | 99/23 |
| 3,438,787 | 4/1969 | DuRoss | 426/660 |
| 4,209,547 | 6/1980 | Scarpiello et al. | 426/607 |
| 4,234,618 | 11/1980 | Jasko et al. | 426/660 |
| 4,565,702 | 1/1986 | Morley et al. | 426/804 |
| 4,698,232 | 10/1987 | Sheu et al. | 426/660 |
| 4,766,004 | 8/1988 | Moskowitz | 426/804 |
| 4,839,192 | 6/1989 | Sagi et al. | 426/607 |
| 4,877,636 | 10/1989 | Koyano et al. | 426/607 |
| 4,910,037 | 3/1990 | Sagi et al. | 426/660 |
| 5,104,674 | 4/1992 | Chen et al. | 426/610 |
| 5,173,296 | 12/1992 | Andre et al. | 426/660 |
| 5,190,786 | 3/1993 | Anderson et al. | 426/660 |
| 5,258,181 | 11/1993 | Cregier et al. | 426/74 |
| 5,258,199 | 11/1993 | Moore et al. | 426/660 |
| 5,275,835 | 1/1994 | Masterson et al. | 426/607 |
| 5,344,664 | 9/1994 | Fitch et al. | 426/660 |
| 5,409,719 | 4/1995 | Cain et al. | 426/804 |
| 5,422,346 | 6/1995 | Mitchell | 514/54 |
| 5,424,091 | 6/1995 | Cain et al. | 426/660 |
| 5,464,649 | 11/1995 | St. John et al. | 426/660 |

FOREIGN PATENT DOCUMENTS

| | | |
|---|---|---|
| 006034 | 6/1979 | European Pat. Off. . |
| 0470870 | 2/1992 | European Pat. Off. . |
| 0 532 119 | 3/1993 | European Pat. Off. . |
| 0532775 | 3/1993 | European Pat. Off. . |
| 596546 | 5/1994 | European Pat. Off. . |
| 0605217 | 6/1994 | European Pat. Off. . |
| 0634106 | 1/1995 | European Pat. Off. . |
| 664299 | 7/1995 | European Pat. Off. . |
| 0714609 | 6/1996 | European Pat. Off. . |
| 04 131 045 | 12/1994 | Japan . |
| 93/06744 | 4/1993 | WIPO . |
| 96/03888 | 2/1996 | WIPO . |

*Primary Examiner*—Cynthia L. Nessler
*Attorney, Agent, or Firm*—Pennie & Edmonds LLP

[57] ABSTRACT

The present invention relates to a method for increasing the solidification rate of a fat-based confection and to a fat-based confection product wherein the improvement comprises 0.1 to 2.0% insoluble fiber by weight effective for increasing the rate of solidification of the product.

9 Claims, 6 Drawing Sheets

ND OF MAKING FAT-BASED
METHOD OF MAKING FAT-BASED CONFECTION

FIELD OF THE INVENTION

The present invention relates to a fat-based confection and to the production thereof more particularly to a fat-based confection comprising insoluble fibers and its production.

BACKGROUND TO THE INVENTION

The production of fat-based confection products for many purposes comprises a step of shaping, moulding, depositing etc. of a molten or melted fat-based mass. The fat-based mass is then cooled so as to solidify or harden the confection before it is wrapped and packed. The rate of solidification determines the cooling time necessary for the solidifying or hardening of a fat-based confection product, the cooling time affects the overall production time and the production costs.

Fat-based confections flavored with chocolate (cocoa liquor) or peanut (peanut flour) have been found to have a substantially higher solidification rate than fat-based confectionery with the same fat composition but without these additives. For example, the fat-based confection without these additives crystallizes at a 60% running capacity through a cooling tunnel compared to chocolate flavored fat-based mass which can be cooled with a 100% running capacity.

A well known way of improving solidification or the crystallization rate of a fat-based confection, is by adding stearine to the fat-based confection. However, use of larger amounts of stearine suffer from the drawbacks such as a more waxy mouth-feel in the final products. Additionally, the use of stearine results in a process restriction as the stearine has to first be dissolved in the fats the temperature of which has to be at least 140° F. so as to dissolve and melt the added stearine.

SUMMARY OF THE INVENTION

It is therefore an object of the invention to increase the solidification or crystallization rate of a fat-based confectionery product. In particular the invention may increase the solidification or crystallization rate of a non-fibrous fat-based confectionery product.

It is a further object to provide a center filled confectionery product with a fat-based filling wherein the fat-based filling has an increased solidification or crystallization rate. With an increased solidification rate there is a reduced risk that the fat-based filling will leak through its casing detrimental to the quality of the product.

Furthermore it is an aim of the invention to reduce or eliminate the use of stearine in fat-based confection.

We have found, surprisingly, that a major increase in the solidification or crystallization rate can be obtained by adding an amount of insoluble fibers to the fat-based confection. It has also surprisingly been found that just a small amount, from about 0.1 to 1.0% by weight, is all that is necessary to increase the solidification. A small amount of fibers can be used to decrease cooling time of the confectionery products, and this will increase the rate of production thus resulting in cost savings.

Accordingly, in one aspect of the invention the invention provides a fat-based confection product containing about 0.1 to 2.0% insoluble fibers by weight for increasing the rate of solidification of the product.

In the present context a fat-based confection is a confection comprising a fat and carbohydrates composition. Usually, the fat-based confection also comprises proteins e.g. derived from milk or whey. Fat is e.g. selected from the group of vegetable fat, milk fat, or animal fat. The sugar is e.g. sucrose or lactose. The fat-based confection is also a confection comprising fat and a sugar replacer. The sugar replacer is e.g. carbohydrates, sugar alcohols or polyols.

DETAILED DESCRIPTION OF THE INVENTION

Figure 1:
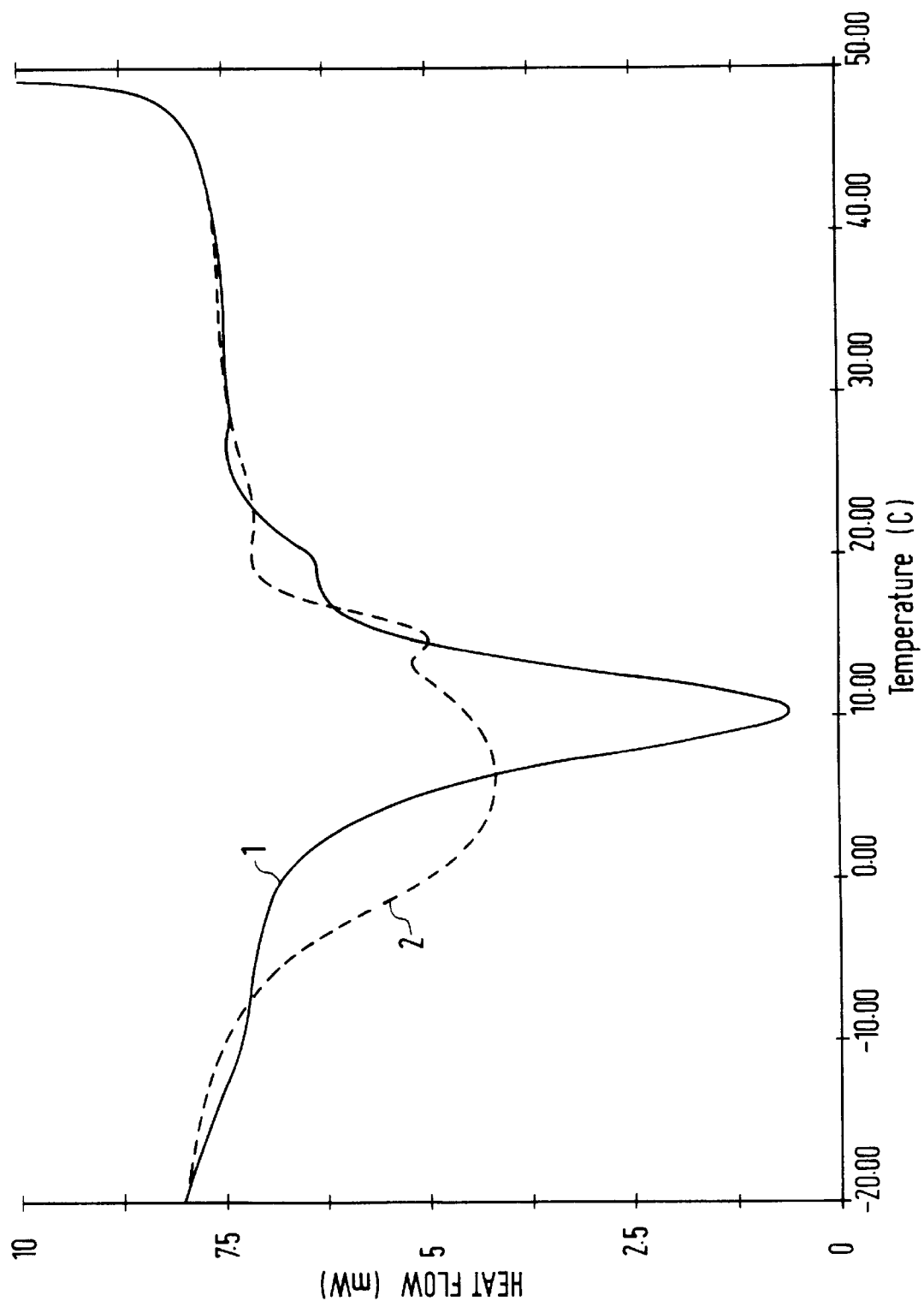
FIG. 1 shows a cooling curve of a chocolate flavored confection and an artificial and non-fibrous flavored confection.

The fat-based confection may be used for various purposes e.g. in combination with other components or on its own. The fat-based confection according to the invention is particularly suitable when the fat-based confection is fat-based filling. It is also suitable for moulded or extruded confection. Another advantageous use of the fat-based confection is as a fat-based outer coating layer e.g. for coating ice cream.

The fat-based confection may be of various formulations for example comprising hydrogenated or non-hydrogenated vegetable oil such as soybean, coconut, and corn. Other vegetable oils which are useful include rape seed oil, sunflower oil, cottonseed oil, peanut oil, rice bran oil, safflower oil, olive oil, kapok oil, sesami oil, palm oil, shea butter, and sal seed oil. Also used may be animal fats such as milk fat, fish oil, beef tallow etc.

The insoluble fibers may conveniently be of material such as soy, corn, wheat, oat, rice bran, or cocoa powder which can increase the crystallization rates when used in amounts as low as 0.1% by weight. Addition of fibers at a level of about 0.5% and 1.0% is preferred, most preferably 0.8% by weight.

It is believed that it is the lack of insoluble fiber in some fat-based confection as compared to chocolate (cocoa liquor) flavored and peanut (peanut flour) flavored fat-based confection that result in a lowered solidification rate of such fat-based confections.

Investigations showed that various insoluble fibers including soy, oat bran and cocoa powder added at 0.1 and 2.0% increased the rate of crystallization of non-fibrous fat-based confection. It is preferred that 0.5 and 1.0% insoluble fibers by weight are added to the fat-based confection. Without wishing to be bound by any theory, it is believed that the fibers provide surfaces for crystallization to initiate.

The non-fibrous fat-based confection may be flavored with non-fibrous flavor such as vanilla, peppermint, cherry, yogurt, orange flavor etc.

A Scanning Probe Microscopic analysis of the topography of these confections revealed that the non-fibrous flavored fat-based confection with added fiber had a very ordered arrangement of crystals, which was absent in the fat-based confection of this type when no fibers were added. The Scanning Prope Microscopic analysis is discussed further below. According to the invention, it has thus been found that insoluble fibers affect fat crystallization and can be exploited to advantage by using small amounts of insoluble fibers in fat-based confection such as: moulded or extruded confection, fat-based fillings, enrobings or coatings including ice cream coatings to decrease the length of residence time of the confection on the cooling tunnel. The invention thus makes it possible to increase the rate of production which results in cost savings.

Of the insoluble fibers preferably 85 to 98% pass through a 200 US sieve, more preferred 90 to 96% pass through the sieve. It was found by a taste panel that using such insoluble fibers in an amount given above gave no change in the product's mouthfeel or flavor.

The fat-based confection is usually flavored. Non-fibrous flavors are e.g. vanilla, yogurt, cherry, orange, peppermint.

Stearine may be added to the fat-based confection according to the invention with insoluble fibers for a further enhancement of the solidification rate. The amount preferred depends on the type of stearine and fat used. Nevertheless, advantageously 0.1 to 0.3%, preferably 0.2 to 0.25%, more preferably at 0.24% stearine by weight is added.

It was found that addition of 0.24% stearine increased the crystallization rates of the confection and increased production capacity to 92% efficiency. Stearine acts as a seeding agent and initiates crystallization.

The present invention also relates to a fat-based confectionery coating or filling containing about 0.1 to 2.0% insoluble fibers by weight, preferably 0.5 to 1.0% insoluble fibers by weight which are effective for increasing the rate of solidification of the coating or filling. Furthermore, it relates to a confectionery product comprising a fat-based confectionery filling. This filling is a fat-based confection as discussed above. Such a confectionery product may be a casing for receiving the filling, wherein the said casing is of caramel candy, preferably hard candy.

In another aspect the invention relates to a method for increasing the solidification of a fat-based confection. The method comprising adding an amount of insoluble fibers effective to increase the rate of solidification of the fat-based confection, and cooling the fat-based confection. Preferably 0.1 to 2.0%, more preferably 0.5 to 1.0% insoluble fibers by weight is added to the fat-based confection for increasing the solidification rate. It has been found that these amounts of insoluble fibers may be added without giving any substantial off-taste to the product.

The invention also relates to the use of insoluble fibers in the manufacturing of fat-based confection for effecting an increase in the confections solidification. The amounts of fibers are as discussed above.

EXAMPLES

The following examples further illustrate the present invention.

Example 1

The fat-based confection in accordance with the invention was produced in the following way:

The fat used for the fat-based confection is partially hydrogenated vegetable oil such as Palm Kernel, Soybean, Cottonseed oil. The fat-based confection mass is prepared using conventional compound production methods, mixing the raw materials: fat and sugar; refining, high sheer mixing and depositing into wafers. When using the fat-based mass the wafers are melted at approximately 44° C. Flavor/fiber was added to it and the mixture stirred for about 2 min. The melted mass is pumped to a depositing hopper.

The depositor for fat-based candy mass, deposits the fat-based mass into rubber moulds. The moulds are then cooled in a cooling tunnel. The residence time in the cooling tunnel is adjusted depending on the nature of the confections and its solidification time. The confection needs to be sufficiently hardened before it e.g. travels to a twist wrap machine.

The procedure of example 1 is repeated using the following fibers: The fibers used were soy and corn fiber (Lauhoff Grain Company, Danville, Ill.), both of which were ultra fine with 90–96% passing through a 200 US Sieve. Guar Gum (Pronova, Biopolymer, Inc., Portsmouth, N.H.), Natural Sealtest Cocoa and Dutched Cocoa (Nestle), and De Zaan Defatted Cocoa S (Schroeder & Sons, Inc., Fort Lee, N.J.) were also tested to see their effect on fat crystallization. The fibers were added at 0.5% to 1% concentration a to flavored non-fibrous confection. Of the fibers added 80 to 85% by weight was insoluble the remaining part soluble. The amount given below is that of both insoluble and soluble fibers.

Example 2

Comparison

The samples examined are listed in Table 1. As a reference sample, candy whit has a chocolate flavored confection is used. The chocolate flavored fat-based confection comprises both cocoa powder and cocoa liquor, each at a 8% concentration by weight of the confection mass.

For the present examples, the examination of the samples was conducted using Differential Scanning Calorimeter (DSC) to emulate the cooling tunnel in the factory. The well setting chocolate flavored confection was used as a reference.

The above-mentioned Differential Scanning Calorimeter (DSC) analysis was performed using a Perkin-Elmer Differential Scanning Calorimeter, DSC-7. Indium (m.p= 156.86° C. and heat of fusion=28.465 J/g) and Gallium (m.p.=29.78° C.) were used to calibrate the instrument. A small quantity of confections/fat samples (10–20 mg) were taken into a sample pan and introduced into the DSC which was stabilized and maintained at 50° C. The temperature was initially held at 50° C. for 10 min and then cooled to −25° C., at a rate of −10° C. or at −5° C./min. The cooling curve was recorded and stored in a computer. Heat of crystallization expressed as Joules/gram was calculated using the DSC-7 software.

TABLE 1

Table 1 shows the effect of different fibers on the crystallization data of fat confections. Three types of cocoa (defatted, natural and alkali-treated), ranging in insoluble fiber content between 26.0 to 28.5% were used for this study. Defatted cocoa (0.3% fat) was chosen to see the effect of fiber without interference from the cocoa butter in the cocoa. Alkaline treated Dutched cocoa and regular cocoa had 11% and 18% fat, respectively. All the three cocoa at 1% concentration showed a shift in the onset to a higher temperature compared to the non-fibrous fat-based confection, the Dutched cocoa being the most effective (Table 1). While the Dutched cocoa and defatted cocoa showed a difference in level of activity depending on the concentration, 1% being higher than 0.5%, the natural cocoa did not show any such difference. Similarly the guar and corn fiber were more effective at 1.0% level while this was reversed in the soy fiber. The soy fiber and corn fibers increased the temperature of onset of crystallization more effectively than the cocoa. Addition of guar gum, which does not comprise any substantial amount of insoluble fibers, showed no substantial variation of the onset temperature. This result confirms that it has been found according to the invention that it is the insoluble fibers which are effective for an increase in the solidification rate. The addition of fibers did not produce any major change in the heat of crystallization of the confections as represented in Table 1. Addition of defatted cocoa showed a lowering of heat of crystallization of pure fat, but not the confections.

TABLE 1

Effect of Fibers on the Crystallization of

DSC Cooling Data[1]

| Confection | Fibers added (%) | 1) Onset | 2) P max | 3) Heat of crystallization (J/g) |
|---|---|---|---|---|
| Chocolate | — | 18.53 | 14.85 | −18.99 |
| Peanut | — | 19.74 | 17.02 | −19.65 |
| Art. flavor | — | 15.51 | 11.82 | −23.85 |
| Art. flavor | defatted cocoa (0.5) | 15.57 | 11.67 | −24.46 |
| Art. flavor | defatted cocoa (1.5) | 17.91 | 13.47 | −24.75 |
| Art. flavor | Dutched cocoa 0.5%) | 16.99 | 13.33 | −23.77 |
| Art. flavor | Dutched cocoa (1.0) | 18.38 | 14.65 | −22.99 |
| Art. flavor | natural cocoa (0.5) | 17.45 | 13.40 | −24.83 |
| Art. flavor | natural cocoa (1.0) | 17.48 | 13.50 | −24.44 |
| Art. flavor | corn fiber (0.5) | 18.71 | 15.32 | −22.68 |
| Art. flavor | corn fiber (1.0) | 20.87 | 16.52 | −21.96 |
| Art. flavor | soya fiber (0.5) | 23.79 | 19.17 | −22.86 |
| Art. flavor | soya fiber (1.0) | 19.29 | 15.65 | −24.12 |
| Art. flavor | guar (0.5) | 15.62 | 11.10 | −24.83 |
| Art. flavor | guar (1.0) | 16.45 | 12.79 | −22.79 |

[1]DSC conditions: 50° C. to −20° C. @ −5° C./min

It follows from the above examples and in accordance with the present invention that by adding a certain amount of insoluble fibers (preferably from 0.1 to 1% by weight) to a fat-based confectionery product which from the outset is substantially free of insoluble fibers, a significant increase in the crystallization rate can be obtained.

FIG. 1

FIG. 1 shows the DSC cooling Curve of the chocolate flavored confection and the non-fibrous flavored Confection, superimposed on each other. As can be seen the dark confection (1) had a higher solidification temperature (onset) as well as faster crystallization rate (sharpness of the peak) as compared to the non-fibrous flavored Confections (2). Unexpectedly, the cocoa butter in the added cocoa of the chocolate flavored confection did not soften the fat due to eutectic effect and lower the onset of crystallization.

FIG. 2

Figure 2:
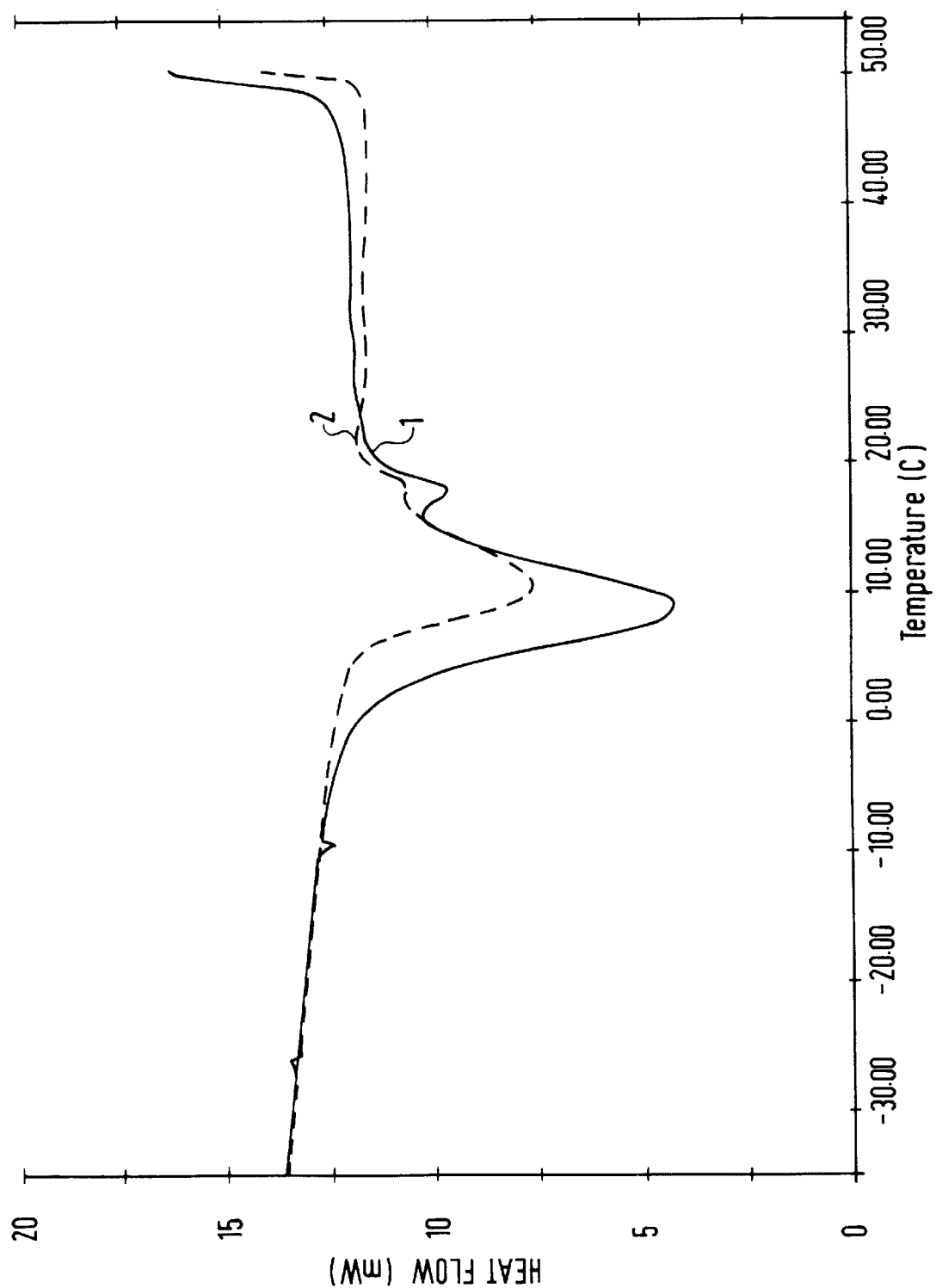
FIG. 2 shows the effect of the artificially flavor on the solidification of the fat-based confection.

FIG. 2 shows the effect of non-fibrous flavor on the Solidification of the Fat-based Confection. In FIG. 2 the cooling curve of the fat-based confection is shown, with (1) and without (2) the non-fibrous flavor. There is no major difference between the cooling curves suggesting that the flavor did not produce any major effect on the solidification of this fat-based confection. It should be noted that this is not the general norm as minor components, including flavors, can have a bad or beneficial effect upon the growth of crystals, even when present in trace amounts.

FIG. 3

Figure 3:
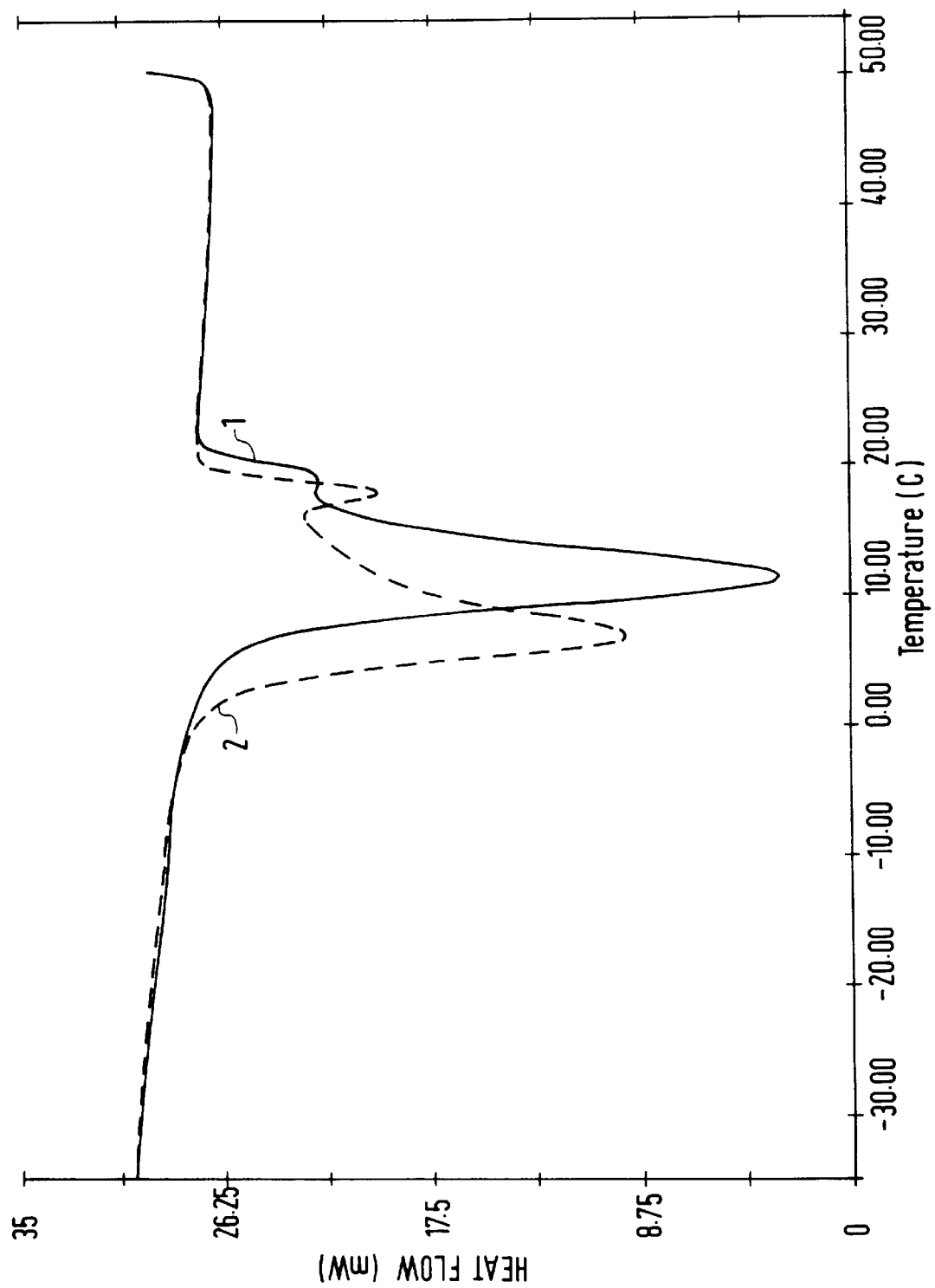
FIG. 3 shows the effect of insoluble fibers on the solidification of fat and artificially flavored confection.

FIG. 3 shows the effect of insoluble fibers on the solidification of fat and non-fibrous flavored fat-based confection. It shows the effect of added defatted cocoa on the crystallization of a Paramount Fat C which is a partially hydrogenated cotton seed and soybean oil. The addition of defatted cocoa (1) shifts the onset to a higher temperature, from 19.36° to 20.33°, and the peak (max) from 6.85° to 11.37° C. The sharpness of the curve also shows that the added cocoa improves the crystallization rates. The heat of crystallization with (1) and without (2) the added cocoa was −96.33 and −100.47 J/g, respectively.

FIG. 4

Figure 4:
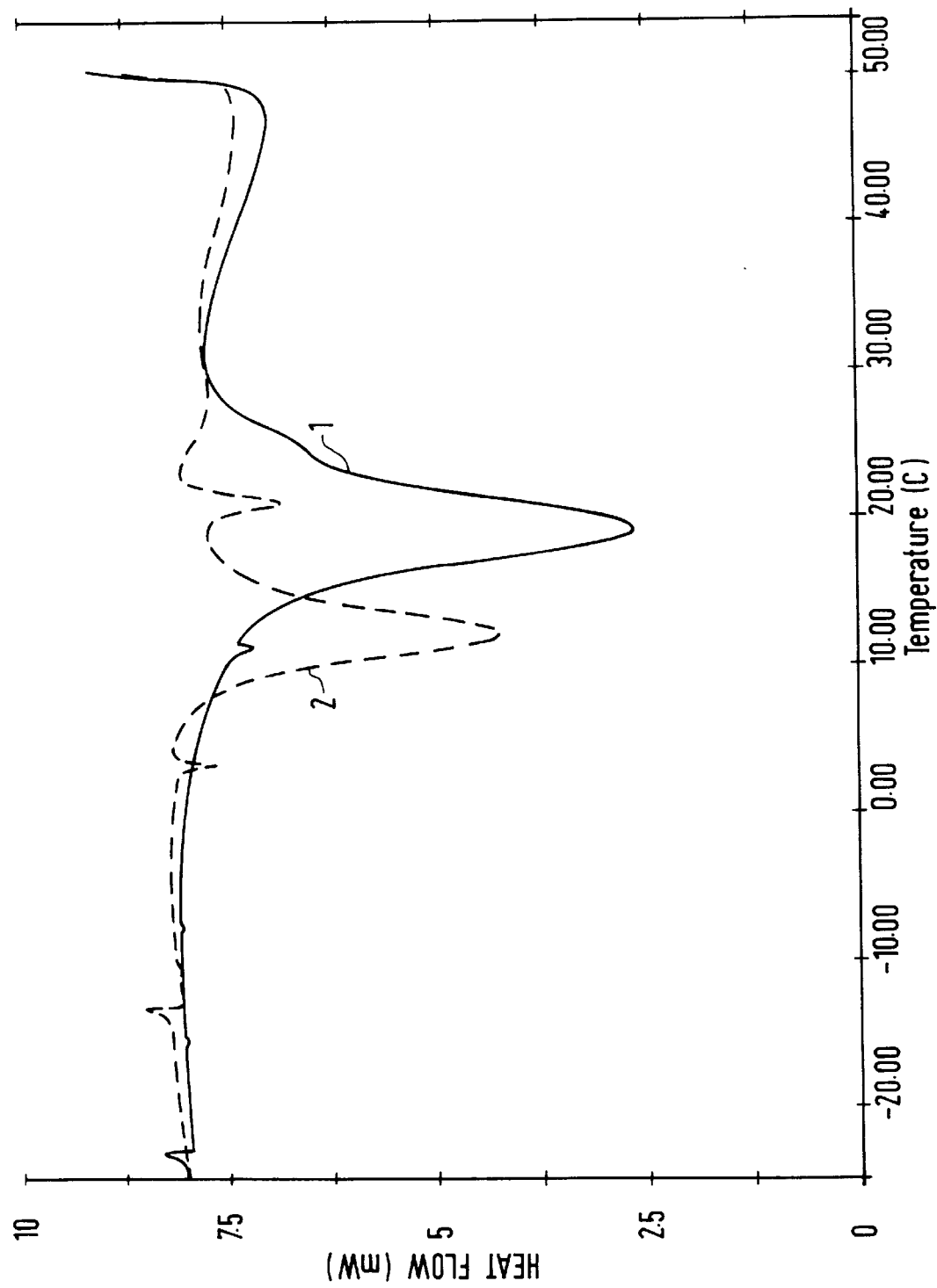
FIG. 4 shows a representation of a cooling curve showing the effect of added soy fiber on the crystallization of an artificially flavored confection.

FIG. 4 gives a representative DSC curve showing the effect of added soy fiber (0.5%) (1) on the crystallization of non-fibrous flavored confection (2). All cooling data are summarized in Table 1.

FIGS. 5 & 6

Figure 5:
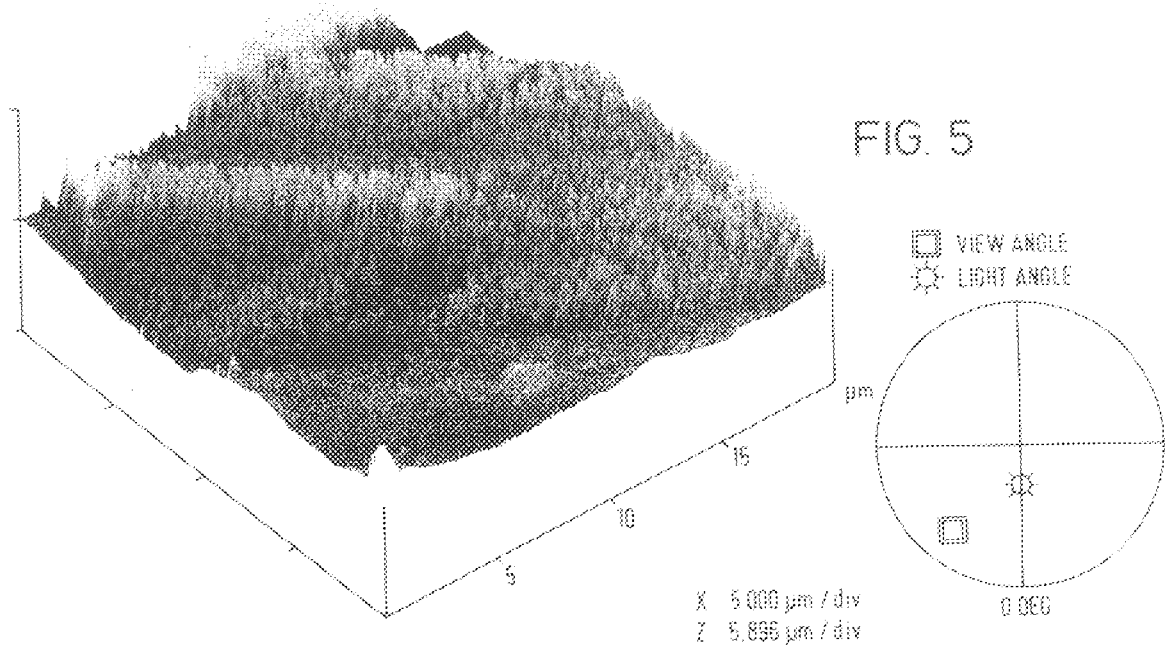
FIG. 5 shows the topography of an artificially flavored confection with added 0.5% soy fiber.
Figure 6:
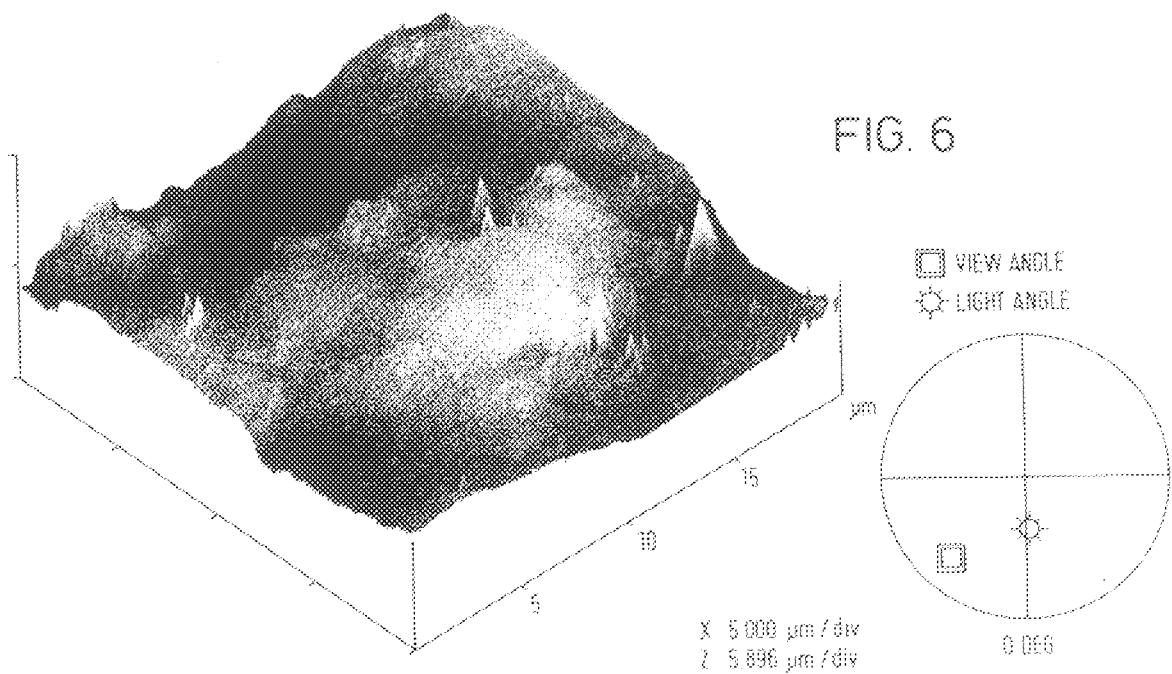
FIG. 6 shows topography of the ordered arrangement of the crystals which is lacking in the confection without the added insoluble fibers.

As mentioned above it is believed that the insoluble fibers may provide a surface for the crystallization to start or they could be acting as a seeding agent. Scanning Probe Microscopic examination of non-fibrous flavored confection with and without fibers revealed a pronounced difference in their topography and growth of crystals. FIG. 5 is an example of non-fibrous flavored confection with added 0.5% soy fiber. The topography shows the ordered arrangement of the crystals which is lacking in the confections without the added fibers (FIG. 6).

Candies with 1% added natural cocoa were made and subjected to a taste test. No significant differences between treated and untreated samples were picked up by the taste panel with regard to mouthfeel or flavor.

In the above discussed Scanning Prope Microscopic analysis was conducted as follows. This microscope uses the feeling of the Van der Waals forces not light. Topographic digital images were obtained using a Dimension 3000 atomic force microscope equipped with a cantilever mounted silicon nitride crystal tip. Tapping mode was achieved by vibrating the tip with piezo-electric impulses after initially damping the natural amplitude of the cantilever oscillation. The oscillation amplitude energy loss caused by the tip approaching the surface was used to identify and measure surface features. This technique was used to avoid frictional, adhesive, electrostatic and other difficulties that can interfere with other AFM techniques. Samples were mounted on mica discs. The scan area was 10 microns square. Image analysis was used to flatten the images.

What is claimed is:

1. A method for increasing the rate of solidification of a fat-based confection, the method comprising adding an amount of insoluble fiber effective to increase the rate of solidification of the fat-based confection, and cooling the fat-based confection, wherein the insoluble fiber added is selected from the group consisting of soy, wheat, oat, rice bran, corn, cocoa, and combinations thereof.

2. A method according to claim 1, wherein the amount of insoluble fibers added is from about 0.1 to 2.0% by weight.

3. A method according to claim 1, wherein the amount, is 0.5 to 1.0% insoluble fibers by weight.

4. The method of claim 1, wherein the fat-based confection is in the form of a liquid and is cooled to form a molded or extruded product.

5. The method of claim 1, wherein the fat-based confection is in the form of a liquid and which further comprises providing a shell as the outer portion of a confectionery product, filling the fat-based confection into the shell, and cooling the fat-based confection in the shell to form a filled confectionery product.

6. The method of claim 1, wherein the fat-based confection is in the form of a liquid and is cooled to form a coating on a confectionery product.

7. The method of claim 6, wherein the fat-based confection is in the form of a liquid and is coated onto an ice-cream confection to form a coated ice-cream product.

8. The method of claim 1, which further comprises adding stearine in the confectionery product in an amount sufficient to further enhance the solidification rate.

9. The method of claim 8, wherein the stearine is added in an amount of about 0.1 to 0.3 percent by weight.

\* \* \* \* \*